T. HIGGIN.
Process of Manufacturing Fine Salt.
No. 224,014. Patented Feb. 3, 1880.
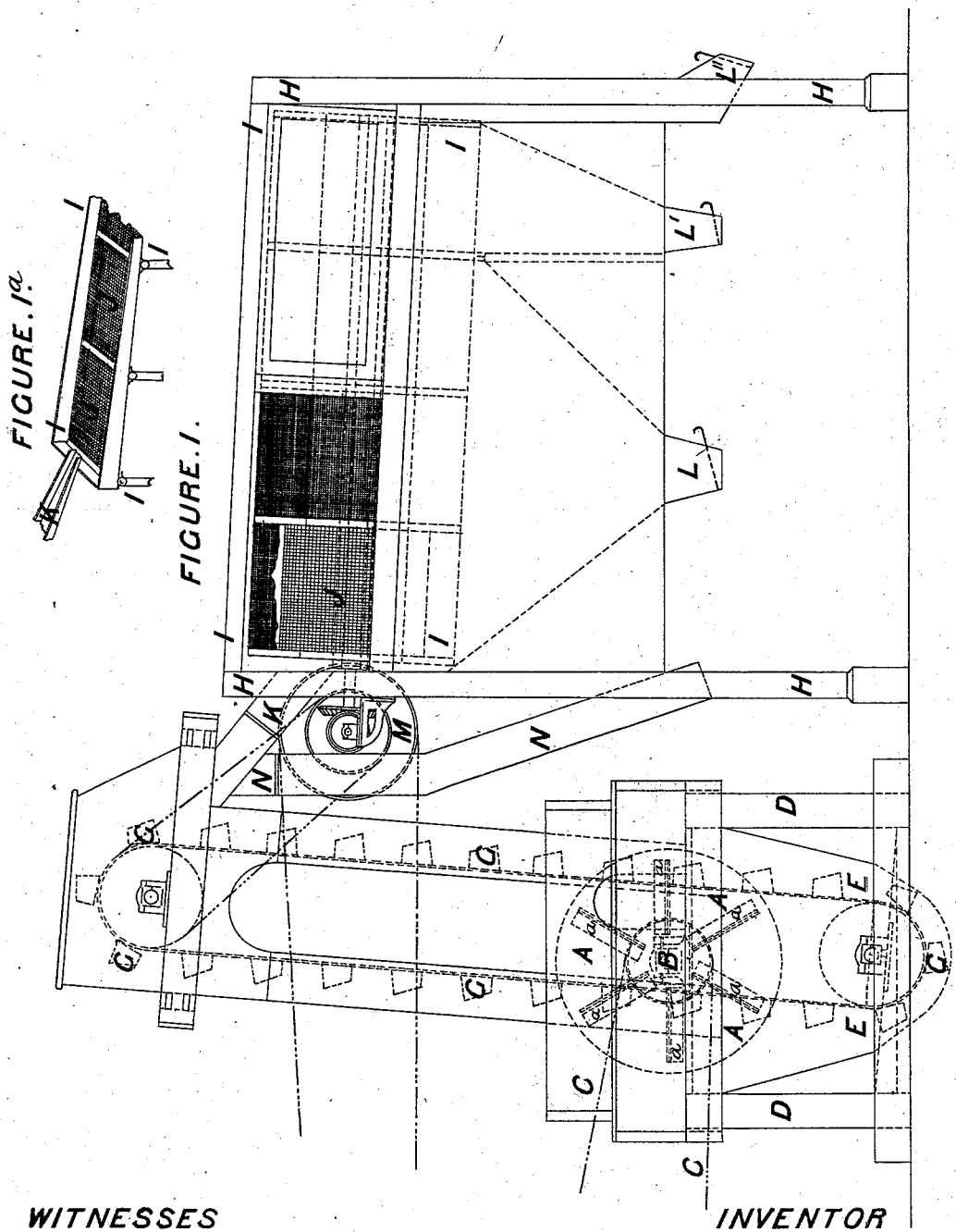
WITNESSES
John Absterdam.
William H Broadnax
INVENTOR
Thomas Higgin By
Amos Broadnax
Atty

UNITED STATES PATENT OFFICE.

THOMAS HIGGIN, OF LIVERPOOL, ENGLAND.

PROCESS OF MANUFACTURING FINE SALT.

SPECIFICATION forming part of Letters Patent No. 224,014, dated February 3, 1880.

Application filed September 4, 1878. Patented in England, June 28, 1877.

*To all whom it may concern:*

Be it known that I, THOMAS HIGGIN, of Liverpool, in the county of Lancaster, in that part of the United Kingdom of Great Britain and Ireland called "England," salt manufacturer, have invented a new and useful Process for Separating Pan-Scale and other Impurities from and Grading Salt, which process is fully set forth in the following specification.

My invention relates to that class of processes employed for pulverizing and reducing to powder lump-salt—that is, manufactured stoved white salt.

The process as in use and generally adopted before my invention for pulverizing lump-salt consisted in passing the lump-salt through rollers or crushing the lump-salt by beaters or hammers. The objection to this process is that the pan-scale, sulphates, and other impurities are crushed up and pulverized with the salt, and it is then impossible to separate such pan-scale, sulphates, and impurities from the salt. Further, the crushed salt is of unequal and varying size of grain, making the salt unsuited for preserving and mixing with dairy produce, inasmuch as the larger grains and the pulverized pan-scale, sulphates, and other impurities are insoluble in butter and cheese, and such butter and cheese are greatly affected in quality and value, according to the nature of the salt used.

My invention consists in the production from lump-salt—that is, manufactured stoved white salt—of a novel and superior form of pure, uniform grain-salt, that can be used with great profit in the manufacture of dairy produce.

To enable my invention to be clearly understood I have annexed a sheet of drawings, so that my new process may be clearly distinguished from the processes at present in use.

The drawing Figure 1 illustrates an apparatus for treating lump-salt according to my invention; and it consists of a disk, A, which is provided with a series of spokeshave or plane or cutter-blades, *a*. The disk A is mounted on and rotated at a high velocity with the shaft B by means of the pulley-strap C. The disk A and shaft B are mounted on a frame, D, provided with a hopper or receiver, E, and a vertical elevator, G. The elevator is connected, by means of a chute, K, with a rotating reel or reciprocating tray, I, which is mounted on a frame, H, provided with chutes L L′ L″. The reel I is covered with silk, wire, or other gauze of suitable mesh, and is also provided with an internal rotary riddle, J. The reel is rotated by means of the gear M. The elevator is provided with a chute, N, to be used when the salt is not passed through the reel I.

The process of treating lump-salt according to my invention, with an apparatus such as just described, consists in subjecting the lump-salt to treatment by cutting and chipping, and thereby pulverizing or separating the grains by means of the rotating spokeshave cutters or blades *a* set in the disk A. The result of such treatment is, that the salt is grain-separated as against being powdered, and the pan-scale, sulphates, and other foreign impurities are chipped off in lumps, and through their hard nature separated from the lump-salt without being crushed to powder, as by the use of rolls or hammers, as at present practiced. After treatment by the cutters *a* the salt is transferred from the hopper E to the rotating reel or reciprocating tray I by the elevator G. The salt enters the reel I through the riddle J, which separates the larger portions of the pan-scale, sulphates, and other impurities from the disintegrated salt. The salt then passes into the reel I, where it is further separated and grated by the meshes of the reel, which may be of different grades.

The result of my process of crushing and grading lump-salt by cutting and sifting is that the pan-scale, sulphates, and other impurities can be almost entirely removed from salt, as they do not chip off in uniform grain with the salt, and by sifting such crushed lump-salt through a rotating reel, as shown at Fig. 1, or through a reciprocating tray, Fig. 1ª, a pure, uniform-grained, graded salt can be obtained, the finer grain being used with very great profit in the manufacture of dairy produce and the larger grain being used for preserving and curing meat.

I claim as my invention—

The method of treating lump-salt for the purpose of pulverizing, separating, and purifying it, consisting substantially of, first, submitting the lumps to a cutting or shaving operation, by which the lumps are reduced and the pan-scale knocked or broken from the salt without being crushed with it; second, passing the salt and pan-scale so broken through a succession of sieves or screens, by which the pan-scale and sulphates are separated from the salt, and the salt divided in several grades of uniform fineness and purity.

In witness whereof I, the said THOMAS HIGGIN, have hereunto set my hand and seal this 18th day of July, 1878.

THOMAS HIGGIN. [L. S.]

Witnesses:
 FREDERICK JOHN CHEESBROUGH,
 W. H. WILLIAMS,
 Both of Water Street, Liverpool, England.